E. L. BRILLHART.
WATER PURIFYING AND FILTERING DEVICE.
APPLICATION FILED AUG. 13, 1917.
1,320,118.
Patented Oct. 28, 1919.
2 SHEETS—SHEET 2.
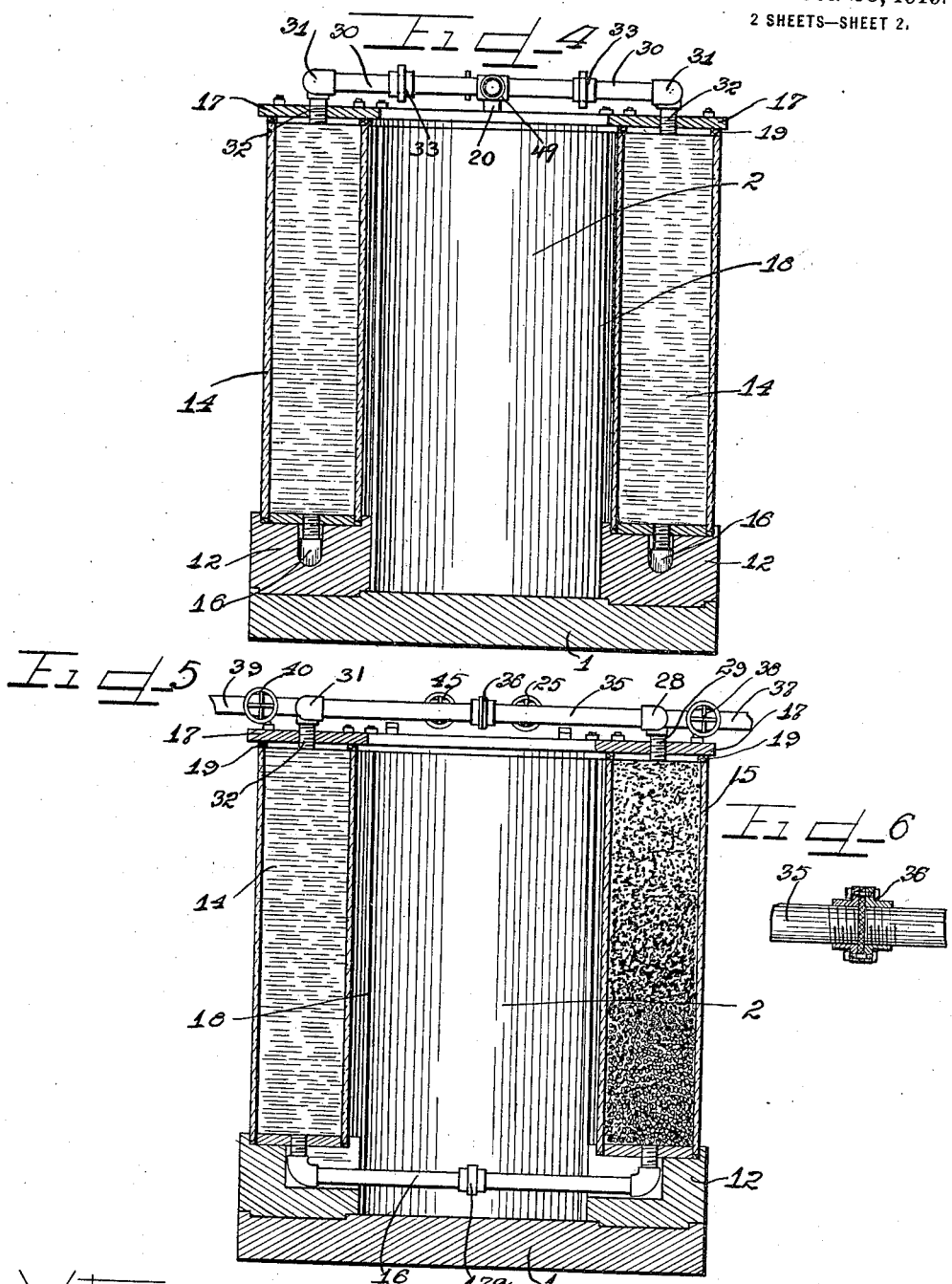

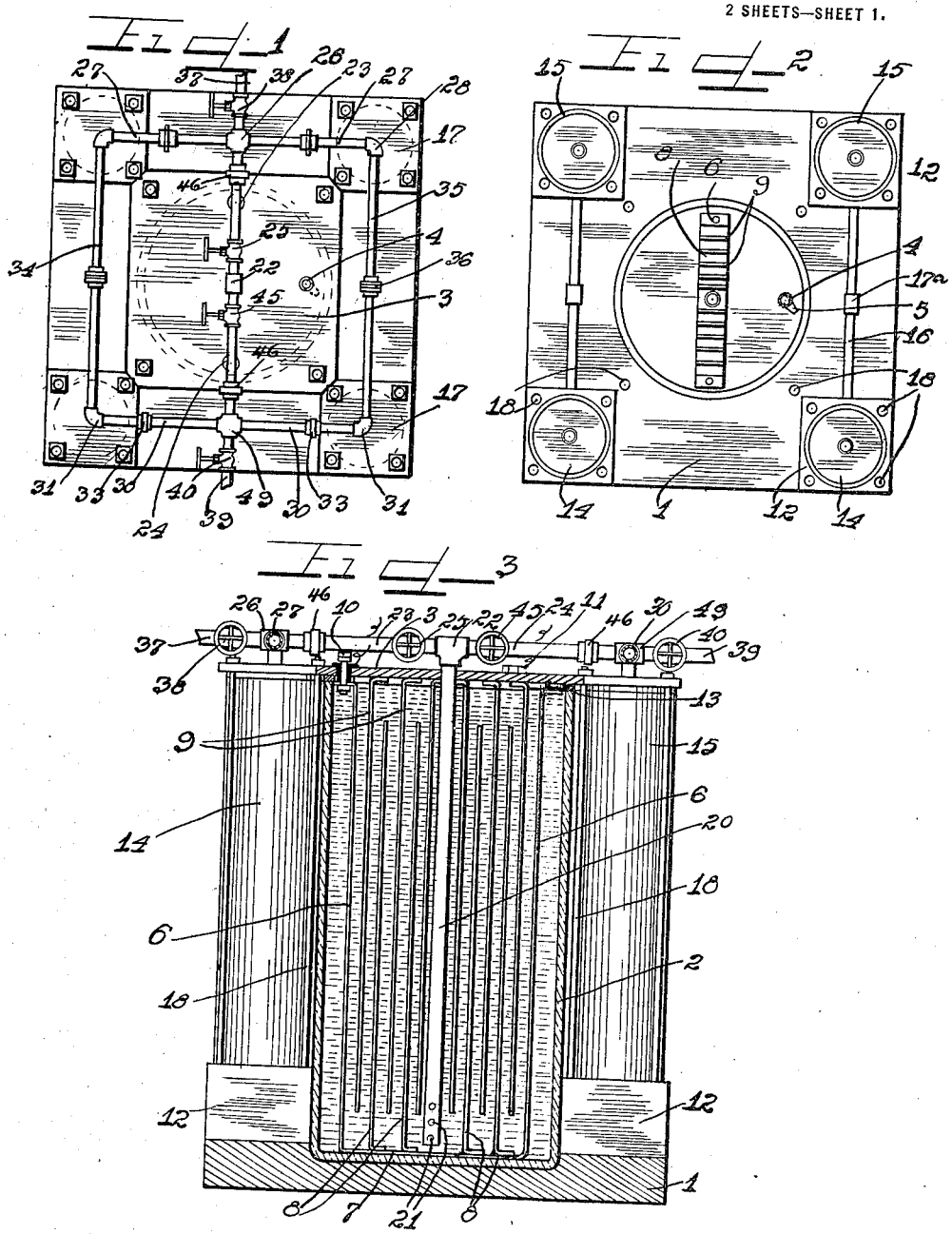

UNITED STATES PATENT OFFICE.

ELMER L. BRILLHART, OF CHICAGO, ILLINOIS, ASSIGNOR TO ELECTRIC SPECIALTY COMPANY, OF NEW LONDON, WISCONSIN, A CORPORATION OF WISCONSIN.

WATER PURIFYING AND FILTERING DEVICE.

1,320,118.   Specification of Letters Patent.   Patented Oct. 28, 1919.

Application filed August 13, 1917. Serial No. 185,915.

*To all whom it may concern:*

Be it known that I, ELMER L. BRILLHART, a citizen of the United States, and a resident of the city of Chicago, in the county of Cook and State of Illinois, have invented certain new and useful Improvements in Water-Purifying and Filtering Devices; and I do hereby declare that the following is a full, clear, and exact description of the same, reference being had to the accompanying drawings, and to the numerals of reference marked thereon, which form a part of this specification.

This invention relates to improvements in water purifying and filtering devices.

It is an object of this invention to provide a combined electric and mechanical purifying and filtering device adapted to electrically kill the bacteria in the water, after which the precipitates carried in suspension in the water are filtered therefrom, producing a thoroughly pure water, free from both germs and sediment.

It is further an object of this invention to provide a device of the class specified in which the water is thoroughly agitated by its own velocity and directed between and among the electrical apparatus to thereby subject all of the water continuously to the electrical action while passing through the bacteria destroying chamber.

It is further an object of this invention to provide a device of the class described in which the water, after being electrically treated, passes into a scum chamber and thence through mechanical filtering chambers to be further purified by removal of the precipitate and matter held in suspension by the water.

It is further an object of this invention to provide a device of the class specified in which the device may be cleaned by a simple reversal of the course of the water through a part of the device to thereby clean out the scum and filtering chambers as often as desired without necessitating taking any part of the purifier and filter apart.

It is further an object of this invention to provide a device of the class specified in which water may be continuously purified and clarified for large consumption or may be intermittently treated for small consumption for individual use.

Other and further important objects of the invention will be apparent from the disclosure in the specification and drawings.

The invention (in a preferred form) is illustrated in the drawings and hereinafter more fully described.

On the drawings:

Figure 1 is a top plan view of a device embodying this invention.

Fig. 2 is a top plan view thereof with the cover plates and pipes removed.

Fig. 3 is a vertical section taken through the electrical treating chamber.

Fig. 4 is a vertical section taken through the pure water tanks.

Fig. 5 is a section taken through one of the filter tanks and one of the pure water tanks, showing the communication therebetween.

Fig. 6 is a detail illustrating one of the blind unions.

As shown in the drawings:

The reference numeral 1, designates a base plate or member having a central recess, and standing therein is a cylinder or tank 2, as shown in Fig. 3. Said tank is closed at its upper end by a cover or head 3, through which extends an inlet pipe 4, provided with a nozzle 5, directed at an angle with respect to the wall of the tank whereby the incoming water is given a spiral motion through the tank. An insulating ring 13, is placed between the head and tank. Secured to the head plate 3, and insulated therefrom is an anode which comprises a bar 6, of metal, which, as shown, is a continuous strip directed at its ends to the fastened to said head and at its central portion 7, formed to rest on the bottom of the tank. Also rigidly secured to the portion 7, are a plurality of bars 8, which are spaced a suitable distance apart and together with the bar 6, form the anode.

The cathode element comprises bars 9, of suitable metal which are secured to the head 3, and extend inwardly, one between each pair of anode bars 6—8 and 8—8. Electrical terminals 10—11, are connected with the respective anode and cathode elements, adapted for connection with an electrical source of supply, not shown. Secured at the corner of the base plate are blocks 12, recessed to receive therein scum tanks 14, and filtering tanks 15. Said filtering tanks 15, are shown arranged in pairs and each is provided with a filtering material, shown as quartz, in which layers of coarse material are placed at the bottom and top, with intervening layers of finer material. Each filter tank is connected with one of the scum water tanks by means of a pipe 16, provided with a union 17ª, and the blocks 12, are notched to receive the pipe therein at its ends.

Each filter tank 15, and scum tank 14, are closed at their upper ends by heads 17, which are shown integral with the head 3, but obviously may be separate, and clamping bolts 18, secured to the base, extend through apertures in the heads and firmly clamp all the heads in place, and as shown, gaskets 19, are provided to make water-tight joints.

The pipe and valve arrangement hereinafter described permits the water to be directed through the device in purifying and filtering and also reversal therethrough to clean out the scum tanks and filters. This arrangement, as shown, comprises an outlet pipe 20, for the electrically treating chamber which is provided with apertures 21, at its lower end for inlet of water to the pipe. Said pipe extends through the head 3, and is provided with any suitable water-tight joint (not shown). A T 22, is secured to the upper end of the outlet pipe 20, to the opposite sides of which pipes 23—24, are connected, each having a valve 25—45, respectively provided therein, and a union 46, is interposed in each of the pipes 23—24, to facilitate assembling. Secured to the outer end of the pipe 23, is a cross 26, having connected into opposite sides thereof pipes 27, which in turn are connected in elbow T's 28. Nipples 29, afford communication between the elbow T's 28 and filter chambers 15. A cross 49, is secured to the outer end of pipe 24, and pipes 30, are connected to opposite sides thereon on the outer ends of which are elbow T's 31, which in turn are connected to the scum tanks by means of nipples 32, and suitable unions 33, are interposed in said pipes 30 to facilitate assembling.

As shown, for the purpose of bracing and strengthening the pipe arrangement, pipes 34—35, connect the respective elbow T's 28—31, and interposed therein are blind unions 36, shown in detail in Fig. 6, which prevent at all times communication between the tops of the filter and scum chambers. Connected in the cross 26, is a pure water supply pipe 37, provided with a valve 38, and connected in the cross 49, is a waste pipe 39, provided with a valve 40.

The operation is as follows:

The water is admitted to the electrical bacteria chamber or tank 2, and striking the wall of the tank tangentially, is directed in a spiral course through the chamber between the anode and cathode plates, and is continuously subjected to the current passing from the anodes, and through the water to the cathodes which thoroughly treats the water, killing the bacteria therein. After the water has been thoroughly treated, the same flows into the outlet pipe 20. Valve 25, is closed, valve 45, open, and valve 40, is closed. The water, therefore, from the bacteria tank or chamber 2, flows into the upper ends of scum chambers 14, in which the scum collects and is held, and then the water passes from the scum tanks through the pipes 16, into the filter tanks 15. In these tanks, the water is thoroughly filtered as it percolates through the filtering material, and pure clean water is discharged through the supply pipe 37.

This is the normal operation, but when it is desired to clean out the filters, say once each day, the valves 45 and 38, are closed, and valves 25 and 40, opened. When this is performed, the water reverses its course through the filter and scum tanks, and discharges through waste pipe 39, thereby cleaning out the filters.

I am aware that various details of construction may be varied through a wide range without departing from the principles of this invention, and I therefore do not purpose limiting the patent granted otherwise than necessitated by the prior art.

I claim as my invention:

In a device of the class described, a tank, electrodes disposed therein in a diametrical plane, means for directing a stream of water spirally around the interior of said tank around and between said electrodes, an outlet pipe disposed axially in said tank, pipes connected with said outlet pipe, scum tanks connected with said pipes, filter tanks connected with said scum tanks to complete the purifying of the water from said tank, and valves in said pipes adapted to permit the passage of water from said tank through said scum tanks and filter tanks, said valves further adapted to reverse the direction of flow through said scum tanks and filter tanks.

In testimony whereof I have hereunto subscribed my name in the presence of two subscribing witnesses.

ELMER L. BRILLHART.

Witnesses:
CHARLES W. HILLS, Jr.,
EARL M. HARDINE.

Copies of this patent may be obtained for five cents each, by addressing the "Commissioner of Patents, Washington, D. C."